(12) United States Patent
Rong (10) Patent No.: US 11,169,358 B1
(45) Date of Patent: Nov. 9, 2021

(54) VARIFOCAL PROJECTION DISPLAY

(71) Applicant: Facebook Technologies, LLC, Menlo Park, CA (US)

(72) Inventor: Wei Rong, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 194 days.

(21) Appl. No.: 16/023,583

(22) Filed: Jun. 29, 2018

(51) Int. Cl.
| | |
|---|---|
| *G02B 7/00* | (2021.01) |
| *G02B 27/14* | (2006.01) |
| *G02B 7/09* | (2021.01) |
| *G06T 7/70* | (2017.01) |
| *G02B 27/28* | (2006.01) |
| *G02B 27/00* | (2006.01) |
| *G06T 5/00* | (2006.01) |

(52) U.S. Cl.
CPC ............ *G02B 7/09* (2013.01); *G02B 27/0093* (2013.01); *G02B 27/142* (2013.01); *G02B 27/283* (2013.01); *G06T 7/70* (2017.01); *G06T 5/002* (2013.01); *G06T 2207/10048* (2013.01)

(58) Field of Classification Search
CPC ............ G02B 27/0075; G02B 27/0093; G02B 27/017; G02B 27/0172; G02B 27/10; G02B 27/283; G06T 5/002
See application file for complete search history.

(56) References Cited

U.S. PATENT DOCUMENTS

| | | | | |
|---|---|---|---|---|
| 5,406,415 | A | * 4/1995 | Kelly | G02B 27/0172 359/633 |
| 6,008,945 | A | * 12/1999 | Fergason | G02B 27/0172 359/630 |
| 10,025,060 | B2 | 7/2018 | Lanman | |
| 2004/0070839 | A1* | 4/2004 | Yagi | G02B 27/0172 359/630 |
| 2011/0075257 | A1* | 3/2011 | Hua | H04N 13/383 359/464 |
| 2013/0050833 | A1* | 2/2013 | Lewis | A61B 3/111 359/630 |
| 2013/0250185 | A1* | 9/2013 | Sarmiento | G02B 27/0172 348/789 |
| 2016/0187648 | A1* | 6/2016 | Chou | H04N 9/3141 359/633 |
| 2016/0284129 | A1* | 9/2016 | Nishizawa | G06F 3/013 |
| 2017/0160518 | A1* | 6/2017 | Lanman | G06T 19/006 |
| 2019/0219818 | A1* | 7/2019 | Mattinson | G02B 27/0172 |

FOREIGN PATENT DOCUMENTS

JP 2018-28572 * 2/2018

OTHER PUBLICATIONS

U.S. Appl. No. 62/350,644, filed Jun. 15, 2016, Gollier.

* cited by examiner

*Primary Examiner* — Thong Q Nguyen
(74) *Attorney, Agent, or Firm* — Freestone Intellectual Property Law PLLC; Aaron J. Visbeek (57) ABSTRACT

A virtual scene may be projected onto a two-dimensional screen of a head mounted display. The two-dimension screen may be substantially perpendicular to a visual axis of a user wearing the head mounted display. A lens assembly of the projector may be adjusted to focus on a viewing portion of the virtual scene on the screen.

16 Claims, 6 Drawing Sheets

VARIFOCAL PROJECTION DISPLAY

TECHNICAL FIELD

This disclosure relates generally to displays, and in particular to varifocal displays in head mounted displays.

BACKGROUND INFORMATION

Head Mounted Displays (HMDs) are worn on a head of a user and direct image light into the eye of the user. Displays configured for HMDs are sometimes referred to as near-eye displays due to their close proximity to the eye, when in use. Focusing challenges are inherent in the design of near-eye displays and associated optical systems to allow the user of an HMD to focus on virtual images included in the image light directed to the eye. The weight, speed, size, and power consumption of focusing solutions are typically considered in systems that assist HMD users in focusing on virtual images.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for adjusting a lens assembly of a projector in response to images captured by a camera are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

The example systems, methods, and apparatuses that are described in this disclosure utilize a varifocal projection system to assist a user of a Head Mounted Display (HMD) in focusing on virtual object included in a virtual scene. A camera positioned to image the eye of a user of HMD may capture one or more images. A gaze direction of the eye is determined from the image(s) captured by the camera and a viewing portion of a virtual scene that corresponds to the gaze direction is identified. A lens assembly of a projector is adjusted to focus on the viewing portion of the virtual scene that the user is looking at.

Prior techniques to assist a user' focusing included moving a display (e.g. Liquid Crystal Display "LCD" or Organic Light Emitting Diode "OLED") or a large lens in front of the display to bring a viewing portion of a virtual scene into focus for the user. However, moving a relatively large display or lens for focusing purposes (1) uses a significant amount of electrical power to drive the motor; (2) demands significant space between the lens and the display for focusing movement; (3) requires significant time to move the lens or display across the focusing axis; and (4) may add weight due to the size of a focusing lens. Furthermore, accuracy of moving a larger display and/or lens may be low, which limits focus adjustment accuracy. In contrast, adjusting a lens of a projector included in a HMD may use less electrical power because the lens may be smaller and lighter. Additionally, the adjustment length to focus the lens of the projector may be much smaller than moving an actual display and the shorter adjustment length may reduce the amount of focusing time so that the image is presented in the time the user expects.

In some embodiments of the disclosure, a beam splitter directs display light from the projector to a screen of the HMD. The camera may be positioned to receive reflections of the eyebox area from the beam splitter in order to image the eye of a user of the HMD. The beam splitter is a polarized beam splitter and the display light from the projector is polarized in an orientation that is reflected by the polarized beam splitter, in some embodiments. These and other embodiments are described in detail with respect to FIGS. 1-6 below.

Figure 1:
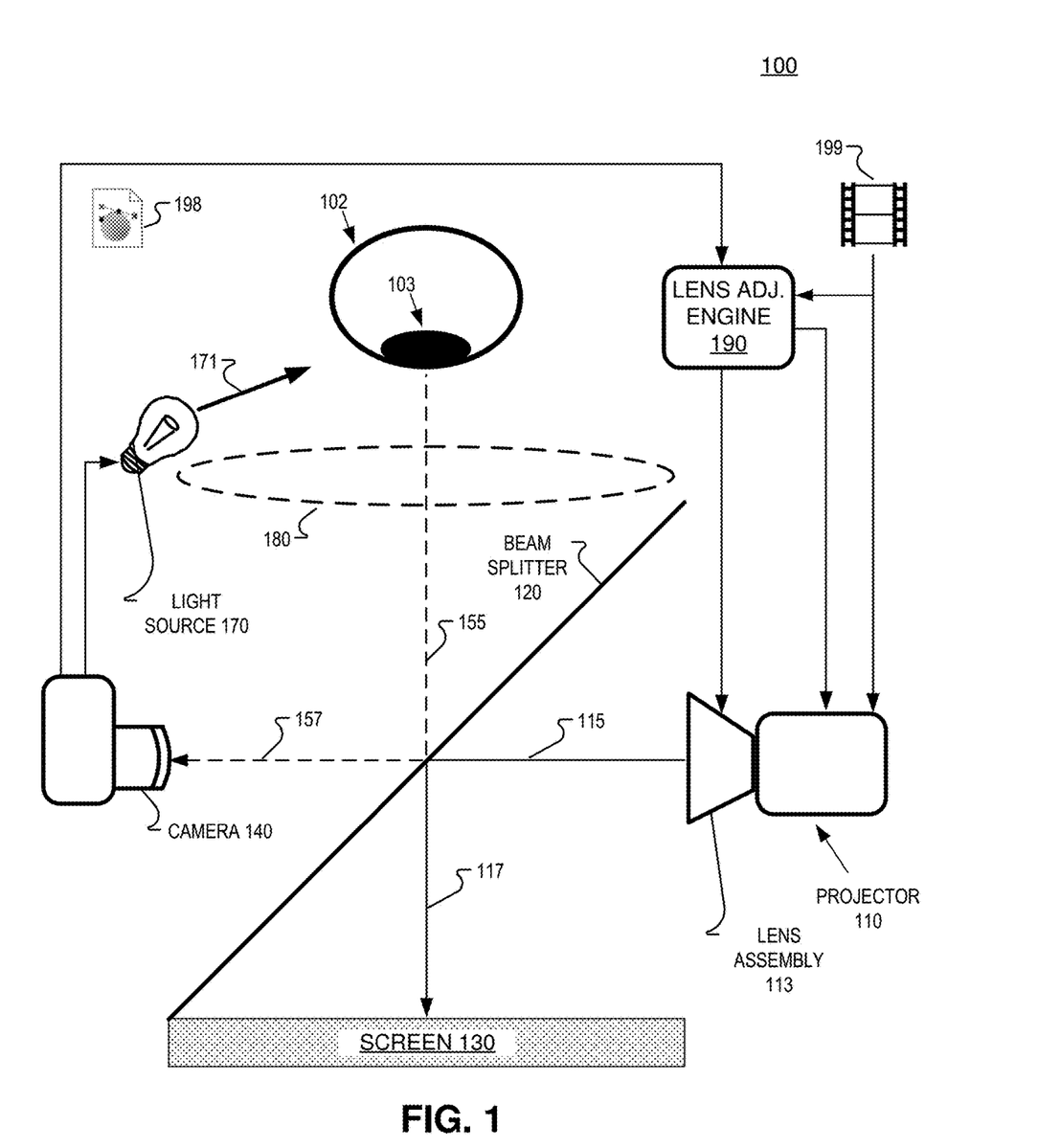
FIG. 1 is a block diagram illustration of an example varifocal projection display configured to adjust a lens assembly of a projector in response to images captured by a camera, in accordance with an embodiment of the disclosure.

FIG. 1 is a block diagram illustration of an example varifocal projection display 100 configured to adjust a lens assembly 113 of a projector 110 in response to one or more images 198 captured by a camera 140, in accordance with an embodiment of the disclosure. The illustrated embodiment of FIG. 1 also includes a beam splitter 120, a screen 130, a light source 170, and a lens adjustment engine 190.

In operation, projector 110 receive a virtual scene 199 to be presented to a viewer. Virtual scene 199 may include one or more images. Projector 110 may include a display that may utilize, microOLED, microLED, dot-matrix-display, Digital Light Processing (DLP) or Liquid Crystal on Silicon (LCOS) architectures to generate the display light. Lens assembly 113 focuses the display light onto screen 130 by way of beam splitter 120, in FIG. 1. Display light propagating along optical path 115 encounters beam splitter 120 which reflects the display light to screen 130 along optical path 117. Beam splitter 120 may be a 50/50 beam splitter. Screen 130 may include a polymer based material that is flexible. Although a plan view of screen 130 is illustrated in FIG. 1, screen 130 is a two-dimensional screen and may fill a substantial portion of a user's field of view (FOV) when a user is wearing an HMD that includes varifocal projection display 100. Screen 130 may be opaque and white. Screen 130 may be semi-transparent. Screen 130 may be substantially perpendicular to a visual axis of a user when the user is looking straight ahead. When a user is looking straight ahead, the visual axis of the user may go through the middle of two-dimensional screen 130.

In one embodiment, beam splitter 120 is a polarized beam splitter (PBS) that reflects light at a first polarization orientation (e.g. p-polarized light) and absorbs or passes light in a second polarization orientation (e.g. s-polarized light). When beam splitter 120 is a PBS, display light projected by projector 110 is polarized in a first polarization orientation that is reflected by the PBS so that substantially all of the display light is reflected to screen 130. Projector 110 may be configured to be directionally perpendicular to the visual axis of the user of the HMD so that the optical path 115 is perpendicular to the visual axis.

Eye 102 is positioned to view the virtual scene projected onto screen 130 through the beam splitter 120. A viewing lens 180 may be included in varifocal project system 100 to focus the virtual scene projected on screen 130 for eye 102. In the illustrated embodiment, the viewing lens is disposed between the beam splitter 120 and eye 102. Varifocal projection system 100 may be considered a near-eye display because of the proximity of screen 130 to eye 102.

Camera 140 is positioned to image eye 102. Camera 140 may include a complimentary metal-oxide-semiconductor (CMOS) image sensor for imaging the eye 102. When a user is wearing the HMD, eye(s) 102 are present in an eyebox area. In FIG. 1, camera 140 is positioned to receive reflections of the eye 102 that includes pupil 103. Reflections off the eye propagate along optical path 155 and are reflected by beam splitter 120 along optical path 157 in the illustrated embodiment.

Camera 140 may be configured to image infrared light. In one embodiment, a filter placed over an image sensor of the camera 140 includes an infrared filter that passes infrared light and rejects visible light. In the illustrated embodiment, light source 170 illuminates eye 102 with infrared light 171. Light source 170 may be an infrared LED emitting infrared light. The emitted infrared light may be centered around 850 nm or 930 nm, for example. In some embodiments, a plurality of light sources 170 may illuminate eye 102. Camera 140 may activate light source 170 to emit infrared light 171 for a small time period long enough for camera 140 to capture images of infrared light reflected off of eye 102 along optical paths 155 and 157. The eye-facing side of beam splitter 120 may include an infrared film for reflecting the reflected infrared light from eye 102 propagating along optical paths 155 and 157. Notably, the reflective infrared film on beam splitter 120 would not affect (or not noticeably affect) visible light from screen 130 propagating to eye 102.

Lens adjustment engine 190 is configured to receive image(s) 198 captured by camera 140. Lens adjustment engine 190 is configured to adjust lens assembly 113 to focus on portions of the virtual scene 199 in response to receiving the image(s) 198 from camera 140. Lens assembly 113 may be a varifocal lens assembly including a set of lenses moving along an optical path as a unit to change the focal length of the lens assembly 113. Lens adjustment engine 190 is illustrated external to projector 110 in FIG. 1, but those skilled in the art appreciate that lens adjustment engine 190 may be included in projector 110, in some embodiments. Lens adjustment engine 190 may include processing logic such as processors, microprocessors, multi-core processors, Application-specific integrated circuits (ASIC), and/or Field Programmable Gate Arrays (FPGAs) to implement the functionality described.

Figure 2:
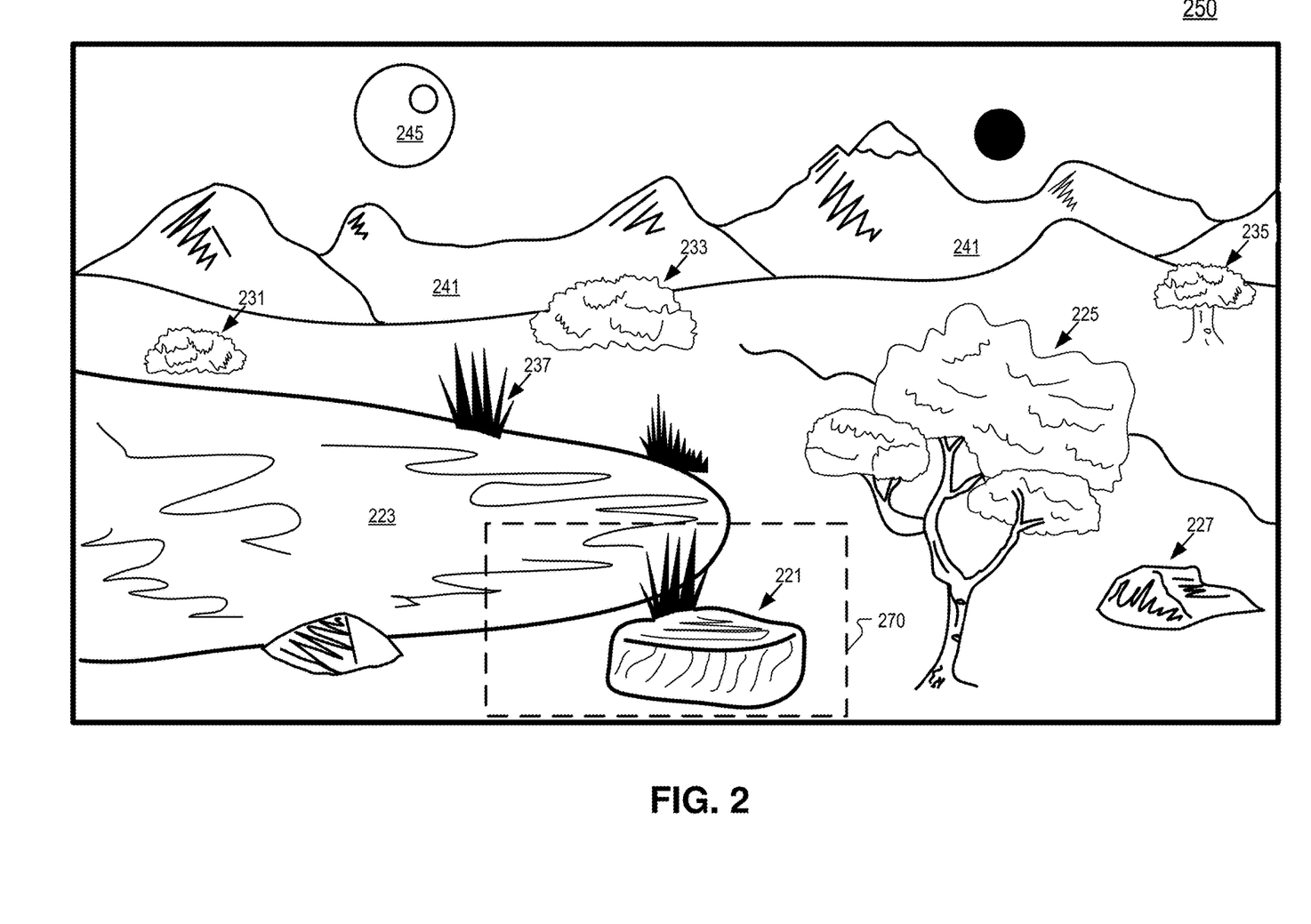
FIG. 2 illustrates an example virtual scene that includes a viewing portion in a foreground of the virtual scene, in accordance with an embodiment of the disclosure.

FIG. 2 illustrates an example virtual scene 250 that includes a viewing portion 270 in a foreground of the virtual scene 250, in accordance with an embodiment of the disclosure. Virtual scene 250 illustrates a landscape. A foreground of virtual scene 250 including rocks 221 and 227, tree 225, and water feature 223. A middle ground of virtual scene 250 includes tree 235, reed 237, and bushes 231 and 233. A background of virtual scene 250 includes mountains 241 and moon 245. A left portion of virtual scene 250 includes bush 231, water feature 223, and moon 245. A middle portion of the virtual scene 250 includes reed 237, bush 233, and rock 221. A right portion of virtual scene 250 includes tree 225, rock 227, and tree 235.

Figure 3:
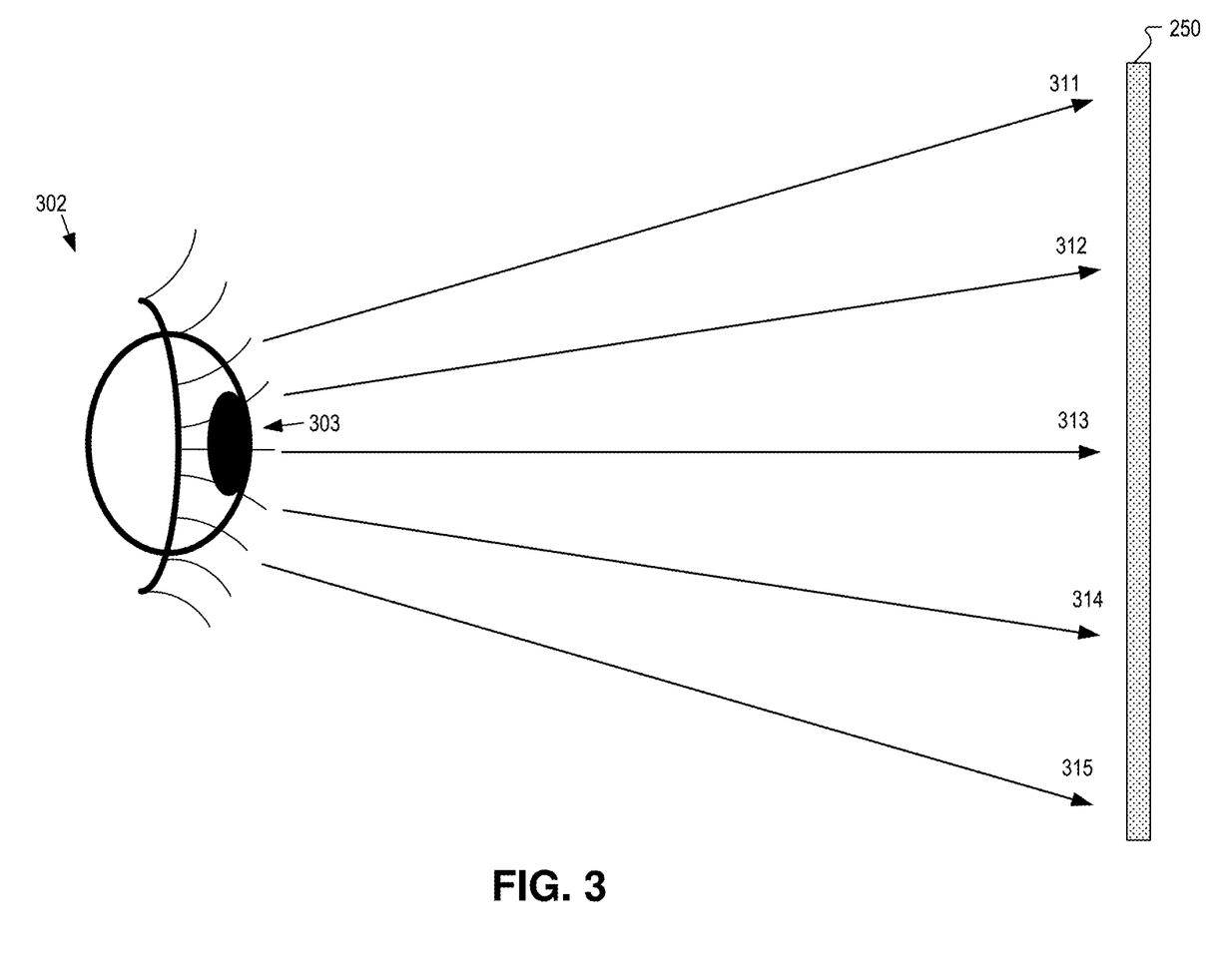
FIG. 3 illustrates example gaze directions of an eye viewing different portions of a virtual scene, in accordance with an embodiment of the disclosure.

FIG. 3 illustrates example gaze directions of an eye viewing different portions of a virtual scene, in accordance with an embodiment of the disclosure. FIG. 3 shows a top view looking down on eye 302 that includes pupil 303. Eye 302 may assume a gaze direction 311 when viewing bush 231 in virtual scene 250. Similarly, eye 302 may assume a gaze direction 312 when viewing reeds 237, a gaze direction 313 when viewing rock 221, a gaze direction of 314 when viewing tree 225, and a gaze direction 315 when viewing rock 227. Pupil 303 will move to support the corresponding gaze direction of eye 302 and, therefore, capturing images of eye 302 and pupil 303 allows a viewing portion of virtual scene 250 to be determined.

Although FIG. 3 shows horizontal gaze directions, it is appreciated that vertical gaze directions can also be determined from imaging eye 302 and that a viewing portion of virtual scene 250 can be determined using both horizontal gaze directions and vertical gaze directions. For example, a viewing portion 270 in FIG. 2 may be identified when the pupil 303 is looking down (vertical gaze direction) while the horizontal gaze direction remains in the center (e.g. gaze direction 313). Glint eye-tracking techniques that track the glint of an eye pupil may be used to determine a gaze direction of a user of an HMD. Other eye-tracking techniques that correspond images of an eye with a viewing portion of a virtual scene may be used in accordance with embodiments of the disclosure.

Figure 4:
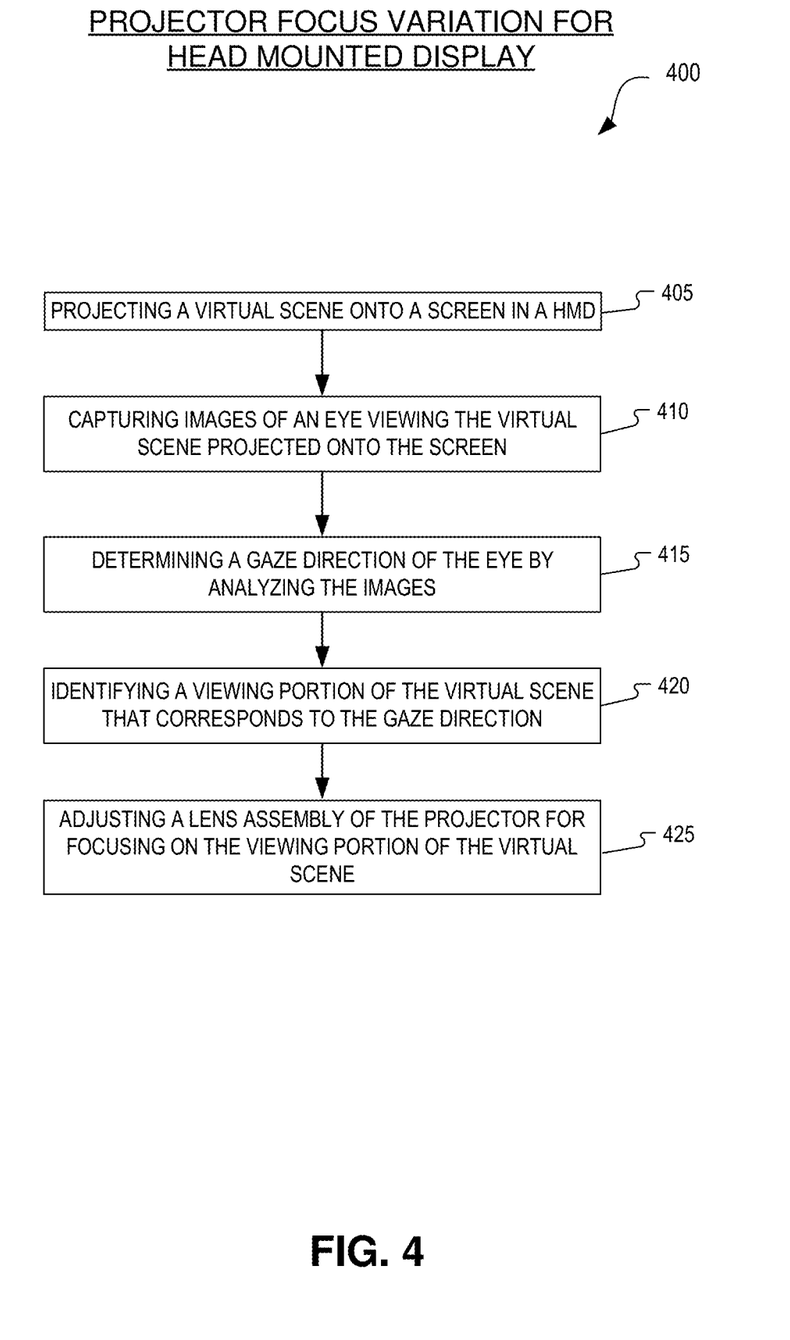
FIG. 4 illustrates an example process of adjusting a lens assembly of a projector in response to a gaze direction of an eye, in accordance with an embodiment of the disclosure.

FIG. 4 illustrates an example process 400 of adjusting a lens assembly of a projector in response to a gaze direction of an eye, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In process block 405, a virtual scene is projected onto a screen included in an HMD. Projector 110 may be used to project the virtual scene, for example.

In process block 410, images of an eye are captured where the eye has viewing access to the virtual scene projected onto the screen. Images of the eye may be captured by camera 140, for example.

In process block 415, a gaze direction of the eye is determined by analyzing the images. The gaze direction may be determined using a glint tracking technique, in some embodiments. Process block 415 may be performed by lens adjustment engine 190, for example.

In process block 420, a viewing portion (e.g. viewing portion 270) of the virtual scene is identified that corresponds to the gaze direction.

In process block 425, a lens assembly of the projector is adjusted for focusing on the viewing portion of the virtual scene. In one embodiment, adjusting the lens assembly includes moving a first lens of the lens assembly axially along an axis shared by a second lens of the lens assembly. In one embodiment, focusing on the viewing portion of the virtual scene includes adjusting the lens assembly to project the viewing portion of the virtual scene onto the screen while portions of the virtual scene that are other than the viewing portion of the virtual scene are not projected or projected outside of the screen. An HMD that includes the projector and screen may have an absorptive black material outside the screen so that any projection that is outside the screen is absorbed or otherwise not viewable to a wearer of the HMD.

In one embodiment, projecting the virtual scene in process block 405 includes projecting the virtual scene onto a first side of a beam splitter (e.g. beam splitter 120) that directs the virtual scene to the screen and capturing images of the eye in process block 410 includes receiving reflections from a second side of the beam splitter that is opposite the first side of the beam splitter.

In an embodiment of process 400, an infrared light source (e.g. light source 170) is activated to illuminate the eye with infrared light and capturing the images in process block 410 includes initiating one or more image captures with a camera (e.g. camera 140) while the infrared light source is illuminating the eye with infrared light. This may allow the camera to receive infrared reflections of the eye to assist in imaging the eye.

In an embodiment of process 400, a blur filter is added to pixels of the virtual scene that are in portions of the virtual scene that are other than the viewing portion. This may serve as additional visual cues that assist a wearer of an HMD in focusing on viewing portion 270.

Figure 5:
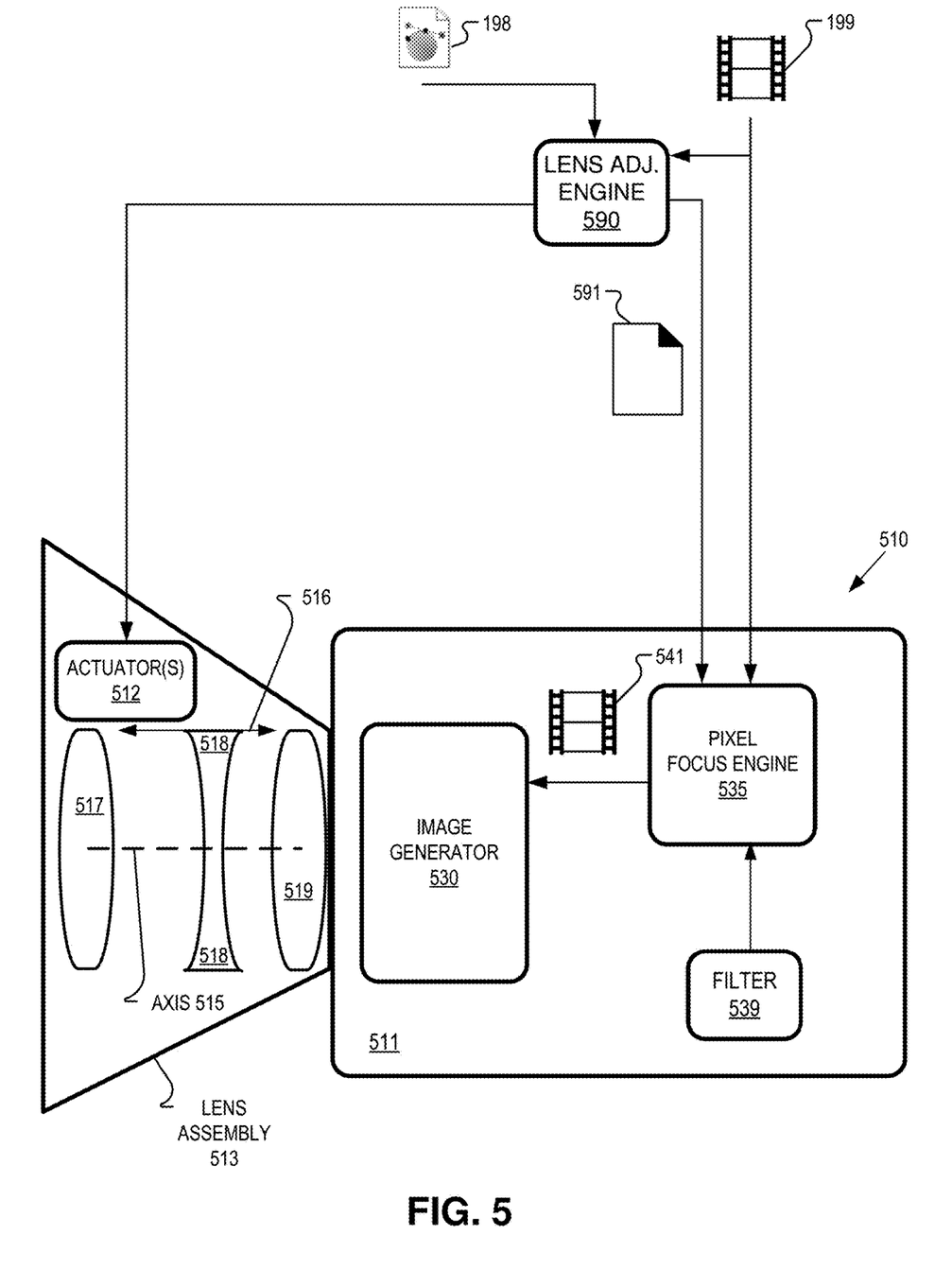
FIG. 5 is a block diagram illustration of an example projector that includes a lens assembly, in accordance with an embodiment of the disclosure.

FIG. 5 is a block diagram illustration of an example projector 510 that includes a lens assembly 513 and a body 511, in accordance with an embodiment of the disclosure. Projector 510 is one example that may be utilized as projector 110, in FIG. 1. Example lens assembly 513 includes a first lens element 517, a second lens element 518, and a third lens element 519. One or more actuators 512 are configured to move at least one lens element (e.g. 518) a translation length 516 to focus lens assembly 513. In FIG. 5, lens 518 is moved axially along an axis 515. Axis 515 may be a central optical axis shared between lens elements 517, 518, and 519. More or fewer optical elements may be included in lens assembly 513 and additional lens movement (in addition to translation length 516) may be included in different embodiments, although not specifically illustrated.

Lens assembly 513 may be a varifocal lens assembly having a variable focal length in which focus changes as focal length changes. Therefore, as the lens assembly zooms in to a viewing portion of a virtual scene (altering the focal length of assembly 113), the focus is adjusted so that the zoomed-in projected image (at the new focal length) is also focused.

Lens adjustment engine 590 is configured to receive image(s) 198 of eye 102 captured by camera 140. Lens adjustment engine 590 is also configured to receive virtual scene 199. Therefore, lens adjustment engine 590 may determine a gazed direction of eye 102 by analyzing images 198 and identify a viewing portion of virtual scene 199 that corresponds to the determined gaze direction. Lens adjustment engine 590 may drive a focus command onto actuators 512 so that actuators 512 move the lens elements of the lens assembly 513 to the proper focal length (zoom level) so that the viewing portion of the virtual scene fills screen 130. Since the distance between projector 110/510 and screen 130 is fixed and known, the actuators 512 may also drive the lens assembly to the proper focus that corresponds to the focal length that lens assembly 513 is zoomed to.

Viewing portion data 591 that identifies the viewing portion (e.g. 270) identified by lens adjustment engine 590 may be optionally passed to a pixel focus engine 535 of projector 510 for optional pixel focusing assistance. In the illustrated embodiment, pixel focus engine 535 receives the virtual scene 199 and the viewing portion data 591 that identifies the viewing portion of the virtual scene 199. Pixel focus engine 535 may add a blur filter 539 (e.g. Gaussian blur) to a fixed quantity of pixels outside of viewing portion 270.

Referring to FIG. 2, a blur filter may be applied to pixels outside of viewing portion 270. In this case, a portion of virtual scene 250 that is larger than viewing portion 270 may be projected onto screen 130, although only the pixels in viewing portion 270 would be in focused to give the user visual cues for focusing. When pixel focus engine 535 is utilized, lens adjustment engine 590 may drive a focus command onto actuators 512 so that the actuators move the lens element of the lens assembly 513 to the proper focal length so that more than viewing portion is projected onto screen 130.

Pixel focus engine 535 may generate blurred virtual scene 541 that includes a blurring of pixels outside of viewing portion 270 and no blurring of pixels inside viewing portion 270. Image generator 530 is configured to receive the blurred virtual scene 541 and emit the blurred virtual scene as display light for focusing by lens assembly 513. Pixel focus engine 535 may include processing logic such as processors, microprocessors, multi-core processors, Application-specific integrated circuits (ASIC), and/or Field Programmable Gate Arrays (FPGAs) to implement the functionality described.

Figure 6:
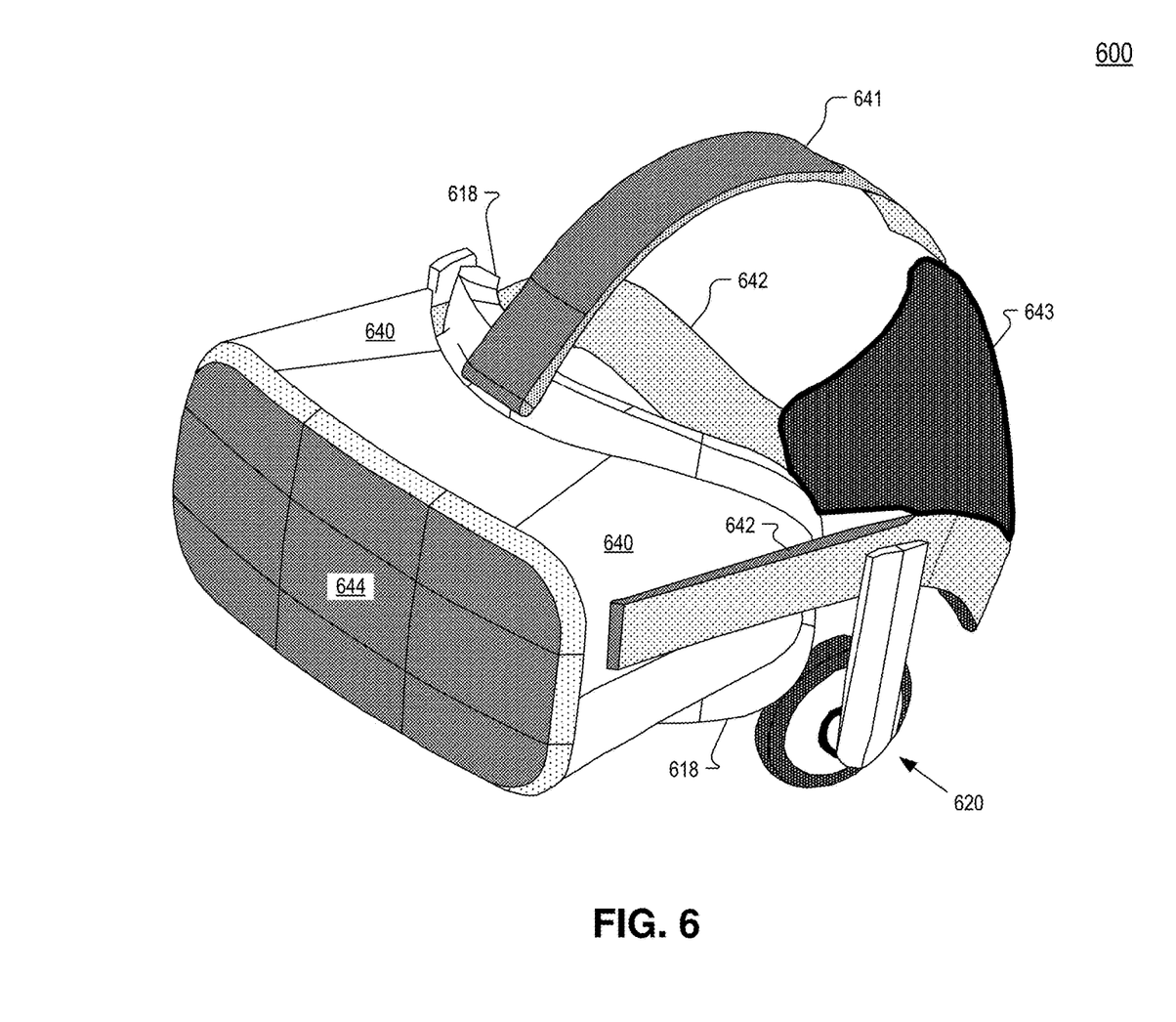
FIG. 6 illustrates an example head mounted display (HMD) that may include a varifocal projection display, in accordance with an embodiment of the disclosure.

FIG. 6 illustrates an example head mounted display (HMD) 600 that may include the embodiments of this disclosure. For example, two varifocal projection systems 100 may be included in HMD 600 to provide focusing of a projector in response to eye-tracking of two eyes. Example HMD 600 includes a top structure 641, a rear securing structure 643, and a side structure 642 attached with a viewing structure 640 having a front rigid body 644. The illustrated HMD 600 is configured to be worn on a head of a user of the HMD. In one embodiment, top structure 641 includes a fabric strap that may include elastic. Side structure 642 and rear securing structure 643 may include a fabric as well as rigid structures (e.g. plastics) for securing the HMD to the head of the user. HMD 600 may optionally include earpiece(s) 620 configured to deliver audio to the ear(s) of a wearer of HMD 600.

In the illustrated embodiment, viewing structure 640 includes an interface membrane 618 for contacting a face of a wearer of HMD 600. Interface membrane 618 may function to block out some or all ambient light from reaching the eyes of the wearer of HMD 600.

Example HMD 600 also includes a chassis for supporting hardware of the viewing structure 640 of HMD 600. Lens adjustment engine 190, projector 110, camera 140, light source 170, beam splitter 120, and screen 130 may be disposed in viewing structure 640, for example. Hardware of viewing structure 640 may include any of processing logic, wired and/or wireless data interface for sending and receiving data, graphic processors, and one or more memories for storing data and computer-executable instructions. In one embodiment, viewing structure 640 may be configured to receive wired power. In one embodiment, viewing structure 640 is configured to be powered by one or more batteries. In one embodiment, viewing structure 640 may be configured to receive wired data including video data. In one embodiment, viewing structure 640 is configured to receive wireless data including video data.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A Head Mounted Display (HMD) comprising:
a two-dimensional screen substantially perpendicular to a visual axis of a user wearing the HMD; and
a projector to direct display light of a virtual scene onto the two-dimensional screen, wherein the two-dimensional screen is opaque and white, wherein the projector includes a lens assembly for adjusting a focus of the virtual scene on the two-dimensional screen, and wherein the lens assembly of the projector is configured to be adjusted based at least in part on a gaze direction of a user of the HMD.

2. The HMD of claim 1 further comprising:
a camera positioned to image an eyebox area of the user of the HMD; and
a lens adjustment engine configured to receive images from the camera, wherein the lens adjustment engine is configured to adjust the lens assembly to focus on portions of the virtual scene in response to receiving the images from the camera.

3. The HMD of claim 2, wherein the lens adjustment engine performs glint eye-tracking analysis on the images received from the camera, and wherein the gaze direction of the user is determined based on the glint eye-tracking analysis.

4. The HMD of claim 2, wherein the lens adjustment engine is further configured to:
determine the gaze direction of an eye of the user of the HMD by analyzing the images from the camera; and
identify a viewing portion of the virtual scene that corresponds to the gaze direction, wherein adjusting the lens assembly includes adjusting the lens assembly to focus on the viewing portion of the virtual scene that corresponds to the gaze direction determined.

5. The HMD of claim 4, wherein the projector is configured to:
receive viewing portion data identifying the viewing portion; and add a blur filter to pixels of the virtual scene that are in portions of the virtual scene that are other than the viewing portion of the virtual scene.

6. The HMD of claim 1, wherein the projector is configured to be directionally perpendicular to the visual axis of the user of the HMD.

7. The HMD of claim 1, further comprising:
an optic for directing the display light from the projector to the two-dimensional screen.

8. The HMD of claim 7, wherein the optic includes a beam splitter positioned to direct the display light to the two-dimensional screen.

9. The HMD of claim 8 further comprising:
a camera positioned to image an eyebox area of the user of the HMD to capture images to support eye-tracking, wherein the camera is positioned to receive reflections of the eyebox area from the beam splitter.

10. The HMD of claim 9 further comprising:
an infrared light source positioned to illuminate the eyebox area with infrared light, wherein the camera is configured to capture the images of the eyebox area when the infrared light source is activated to illuminate the eyebox area.

11. The HMD of claim 8, wherein the beam splitter is a polarized beam splitter, and wherein the display light from the projector is oriented in a first polarization orientation that is reflected by the polarized beam splitter.

12. The HMD of claim 8, wherein the beam splitter is disposed between the two-dimensional screen and an eyebox area of the HMD.

13. A method comprising:
receiving, with a projector, a virtual scene for presenting to a user of a head mounted display (HMD);
projecting, with the projector, the virtual scene onto a two-dimensional screen included in the HMD, wherein the two-dimensional screen is substantially perpendicular to a visual axis of a user wearing the HMD; and
adjusting a lens assembly of the projector to focus the virtual scene on the two-dimensional screen, wherein adjusting the lens assembly is based at least in part on a gaze direction of a user of the HMD.

14. The method of claim 13, wherein adjusting the lens assembly based at least in part on the gaze direction of the user includes:
capturing images of an eye with viewing access to the virtual scene projected onto the two-dimensional screen;
determining the gaze direction of the eye by analyzing the images;
identifying a viewing portion of the virtual scene that corresponds to the gaze direction; and
adjusting the lens assembly of the projector for focusing on the viewing portion of the virtual scene.

15. The method of claim 14, wherein focusing on the viewing portion of the virtual scene includes adjusting the lens assembly to project the viewing portion of the virtual scene onto the two-dimensional screen while portions of the virtual scene that are other than the viewing portion of the virtual scene are projected outside of the two-dimensional screen.

16. The method of claim 14, wherein projecting the virtual scene includes projecting the virtual scene onto a first side of a beam splitter that directs the virtual scene to the two-dimensional screen, and wherein capturing images of the eye includes receiving reflections from a second side of the beam splitter that is opposite the first side of the beam splitter, wherein the second side of the beam splitter is coated with an infrared reflection layer.

* * * * *